(12) United States Patent
Ferlitsch

(10) Patent No.: US 7,847,967 B2
(45) Date of Patent: Dec. 7, 2010

(54) ADAPTIVE DE-SPOOLING SYSTEM FOR PARTIAL BRUTE FORCE COLLATION

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1083 days.

(21) Appl. No.: 10/977,906

(22) Filed: Oct. 30, 2004

(65) Prior Publication Data

US 2006/0092432 A1  May 4, 2006

(51) Int. Cl.
*G06K 15/00* (2006.01)
*H04N 1/00* (2006.01)

(52) U.S. Cl. ............... 358/1.16; 358/1.13; 358/1.15; 358/404; 358/524

(58) Field of Classification Search ............ 358/1.13, 358/1.15, 1.16, 404, 524
See application file for complete search history.

(56) References Cited

U.S. PATENT DOCUMENTS

| | | | |
|---|---|---|---|
| 5,047,955 A | | 9/1991 | Shope et al. |
| 5,087,979 A | * | 2/1992 | Schaertel ............... 358/296 |
| 5,535,312 A | | 7/1996 | Hammer et al. |
| 5,764,863 A | | 6/1998 | Fall et al. |
| 6,023,343 A | | 2/2000 | Hoang et al. |
| 6,293,714 B2 | * | 9/2001 | Noda ........................... 400/61 |
| 6,400,461 B1 | * | 6/2002 | Oikawa ....................... 358/1.1 |
| 6,466,326 B1 | * | 10/2002 | Shima ....................... 358/1.12 |
| 6,549,947 B1 | | 4/2003 | Suzuki |
| 7,016,061 B1 | * | 3/2006 | Hewitt ....................... 358/1.15 |
| 7,304,753 B1 | * | 12/2007 | Richter et al. ............. 358/1.15 |
| 7,345,777 B2 | * | 3/2008 | Lester et al. ............... 358/1.14 |
| 2002/0066989 A1 | * | 6/2002 | Simpson .................. 270/52.01 |
| 2002/0080388 A1 | | 6/2002 | Chrisop et al. |
| 2004/0061890 A1 | | 4/2004 | Ferlitsch |
| 2004/0061892 A1 | | 4/2004 | Ferlitsch |
| 2005/0063008 A1 | * | 3/2005 | Lea et al. .................... 358/1.16 |

* cited by examiner

*Primary Examiner*—Edward L Coles
*Assistant Examiner*—Dennis Dicker
(74) *Attorney, Agent, or Firm*—Law Office of Karen Dana Oster, LLC

(57) ABSTRACT

A system for partial brute force collation of a print job includes a printing device having ROPM capability and memory. The printing device receives at least a portion of the document from a source device. The memory stores at least a portion of the document. The printing device has a memory printing mode and a brute force collation mode. In the memory printing mode the portion of the document stored in memory is printed. In the brute force collation mode any portion of the document not stored in memory is printed. The system can also alternate between the memory printing mode and the brute force collation mode for each of the N copies of the electronic document of the print job such that the resulting printed output is collated.

20 Claims, 16 Drawing Sheets

Collated Output

ADAPTIVE DE-SPOOLING SYSTEM FOR PARTIAL BRUTE FORCE COLLATION

BACKGROUND OF INVENTION

The present invention is directed to an adaptive de-spooling system for partial brute force collation.

Using a source device (e.g. any host or device used for creating or imaging a document including a computer or scanner) having an associated communication component (that may be implemented in hardware or software either directly in the source device or in a connected device or application—e.g. a printer driver or a downstream de-spooling component), a user may transmit an electronic document (e.g. any created document or image thereof to a printing device (e.g. any device used for printing including a traditional printer, copier, MFP, fax machine) to print multiple copies thereof. All of the copies of the document are collectively referred to as a print job. Ideally, the user wants the printed copies to be properly collated such that each copy is in the sequential page order according to the imposition requirement of the print job. For example, FIG. 1 shows a document having X pages (e.g. 100 pages) printed N times (100a-100N) and properly collated so that each printed copy is ordered such that page 1 is on top and page X is on the bottom of the stack of papers. (It should be noted that, depending on the printing device, the output may be "upside-down" such that output is face down and the stack must be "flipped" so that it is properly collated.) Depending on the capabilities of the printing device, properly collated output can be problematic.

RIP (Raster Image Processing) is the process by which document data is converted/prepared from one format (e.g. PDL) into a format suitable for printing (e.g. a bitmap) by the device's output engine. The product of the RIP (process) is referred to as a RIP or RIP data (formatted data or prepared version). The term "RIP" is meant to include any process by which a document is formatted into engine-ready data suitable for outputting by the device's outputting mechanism.

When a user initiates a print job with multiple copies of an electronic document, the printer driver must decide whether collation will be emulated on the source device (i.e. brute force collation) or performed on the printing device (e.g. RIP Once Print Many—ROPM).

A conventional printing device 110 such as that shown in FIG. 2 has limited or no memory and, therefore, cannot perform collation. This type of printing device requires that copy collation must be emulated on the source device. The Sharp AR-161 digital imager is an example of this type of printing device. FIG. 2 shows a source device 112 sending a document 114 to a printer driver 116. The printer driver 116 then performs brute force collation by sending N copies of the document data 118a-118N to a document preparation (e.g. RIP) component 120 of the printing device 110. The RIP component 120 must re-RIP each copy of the document data 118a-118N to create an associated RIP data 122a-122N to be output 124 by the printing device 110 in proper collated order (such as that shown in FIG. 1). The printing device 110 does not have sufficient storage capacity either to hold an entire copy of the document data or the entire RIP of the print job. Traditionally, a printer driver 116 for this type of printing device 110 emulates copy collation on the source device 112. For each of the N user specified copies, the printer driver 116 or a downstream de-spooling component (e.g. MS-WINDOWS® 2K EMF print processor) repetitively sends one copy of the document data to the printing device. Thus, in a four (4) copy print job, the source device 112 would send the printing device 110 four single copies of the document data. One problem with this system is that it generates excessive network traffic because N copies of the document must go over the network. Another problem with this system is that the printing device 110 must perform excessive computation by processing multiple copies.

FIG. 3 shows an improved printing device 130 that has ROPM capability and includes storage sufficient to hold both the print job data (job storage 132) and the entire RIP (prepared document or RIP storage 134) of the print job. The Sharp AR-M450 digital imager is an example of this type of printing device. As shown in FIG. 3, a source device 142 sends a document 144 to a printer driver 146. The printer driver 146 then sends one (1) copy of the document data 148 to the job storage 132 of the printing device 130. The printer driver 146 also sends a command for the number (N) of collated copies to output (e.g. @PJL SET COPIES=<N>). A RIP component 150 of the printing device 130 receives one (1) copy of the document data 152 and creates associated RIP data 154 that is held in RIP storage 134. From RIP storage 134 the RIP data may be transmitted multiple times (156a-156N) to be output 158 by the printing device 130 as output in proper collated order (such as that shown in FIG. 1). For example, an outputting mechanism 158 (e.g. outputting engine, marking engine) retrieves a copy of the entire RIP and prints the appropriate number of copies using ROPM. This system is limited by the size of the job storage 132 and the RIP storage 134 because the amount of memory required will always be less than that required for an arbitrary large document. Problems with collation occur when the printing device cannot hold the entire document data and the RIP in memory all at once.

FIG. 4 shows elements of printing device 170 that has ROPM capability and includes job storage 172 and RIP storage 174 implementing a "chunking technique" when the storage capacity of the printing device 170 is exceeded. The Sharp AR-507 digital imager is an example of a printing device 170 that performs the chunking technique. Using the chunking technique, the printing device 170 has enough storage for the entire job, but not for the entire RIP. Instead, using the RIP component 176 the printing device 170 processes a RIP in "sequential sheet out" order until reaching a storage threshold of the RIP storage 174. For example, if the storage threshold of the RIP storage 174 were ten (10) pages, the portion (or chunk) would be ten (10) pages 180a. The ten (10) page chunk would be sent to the RIP component 176 that would process the process chunk 181a. The RIP'd chunk 181a would be stored in the RIP storage 174 as RIP'd chunk 182b. At this point, the outputting mechanism 178 would output N copies of the RIP'd chunk 182a as an output chunk 184a (FIG. 5). The printing device 170 would then purge the RIP chunk 182a from the RIP storage 174. The next chunk 180b (e.g. pages 11-20) would then be RIP'd 181b, stored in the RIP storage 174 as 182b, and output N times 184b. This process would be repeated until the entire document is processed. The user then hand coalesces the chunks together such that the output is in the format shown in FIG. 1. FIG. 5 shows an exemplary print output from a printing device 170 using the chunking technique. Although this example shows the chunks divided into ten (10) pages and the document size being a hundred (100) pages, these numbers are meant to be exemplary. The disadvantage of the chunking technique is that the entire collation of the document is not automated. The user must perform some hand collation to complete the outputting process.

BRIEF SUMMARY OF THE INVENTION

The present invention is directed to an adaptive de-spooling system for partial brute force collation that provides a convenient method for handling ROPM when the size of the document exceeds the storage capacity to hold at once the entire document data and RIP data.

The present invention is directed to a system for partial brute force collation of a print job. The system includes a printing device having ROPM capability and memory. The printing device receives at least a portion of the document from a source device. The memory stores at least a portion of the document. The printing device has a memory printing mode and a brute force collation mode. In the memory printing mode the portion of the document stored in memory is printed. In the brute force collation mode any portion of the document not stored in memory is printed. The system also includes means for alternating between the memory printing mode and the brute force collation mode for each of N copies such that the resulting printed output is collated.

The present invention also includes a method for partial brute force collation of a print job. The present invention may be implemented using a printing device that receives documents from an external source device.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
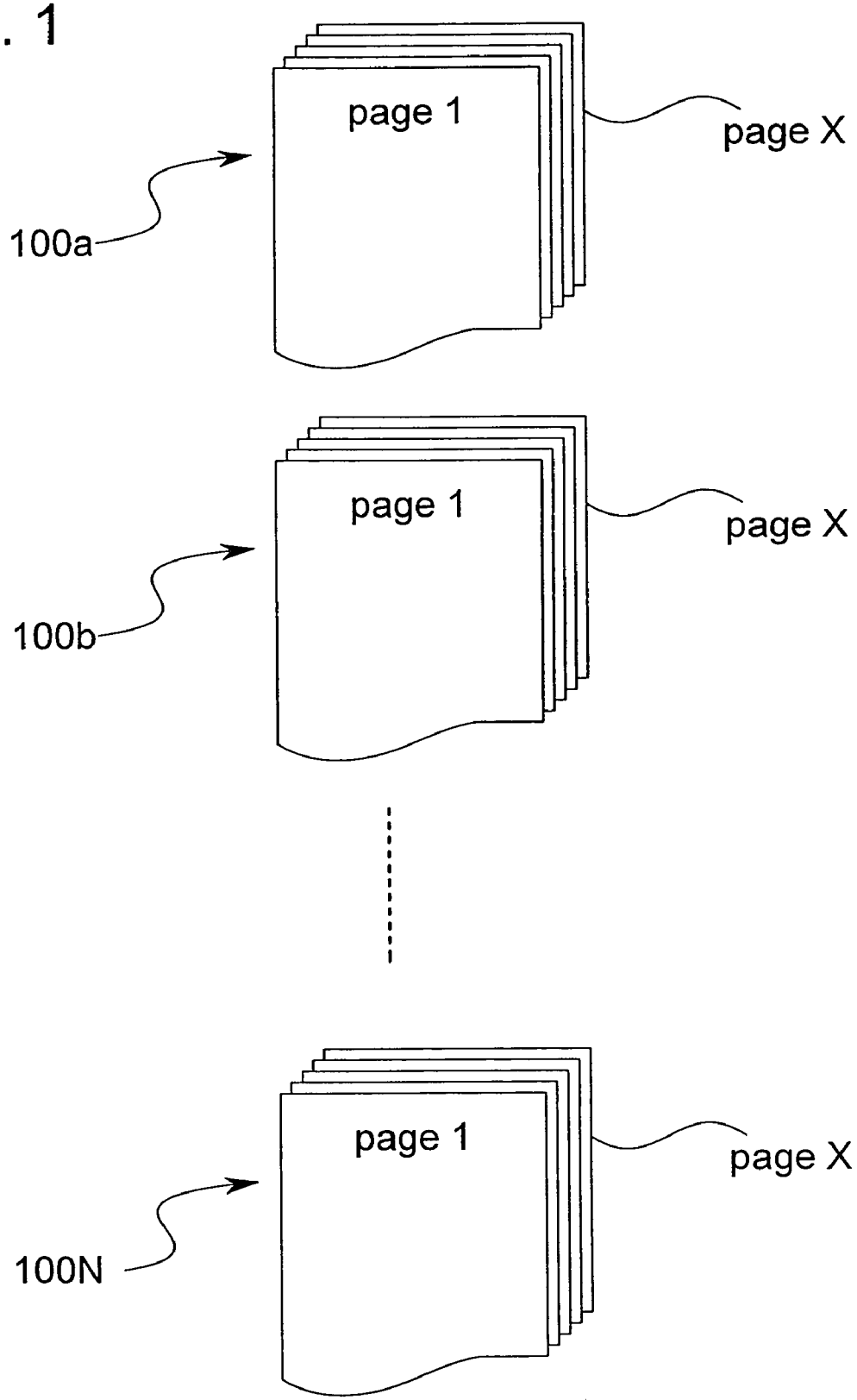
FIG. 1 shows an exemplary print output including a document having X pages printed N times and properly collated so that each printed copy is ordered such that page 1 is on top and page X is on the bottom of the stack of papers.
Figure 2:
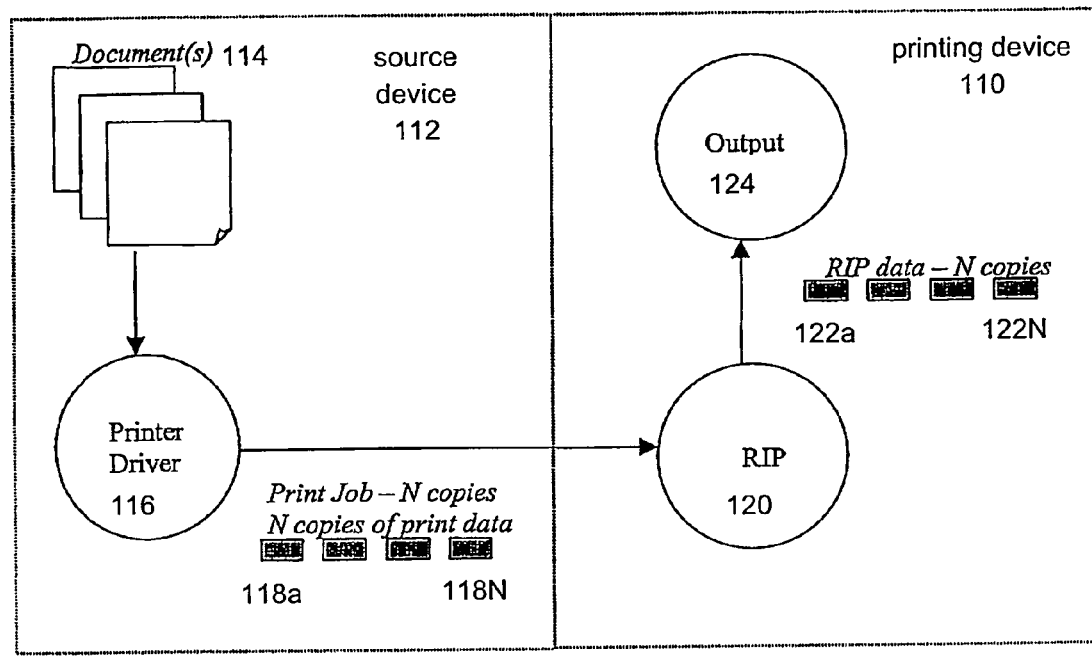
FIG. 2 is a schematic diagram of source device and a prior art conventional printing device that has limited or no memory.
Figure 3:
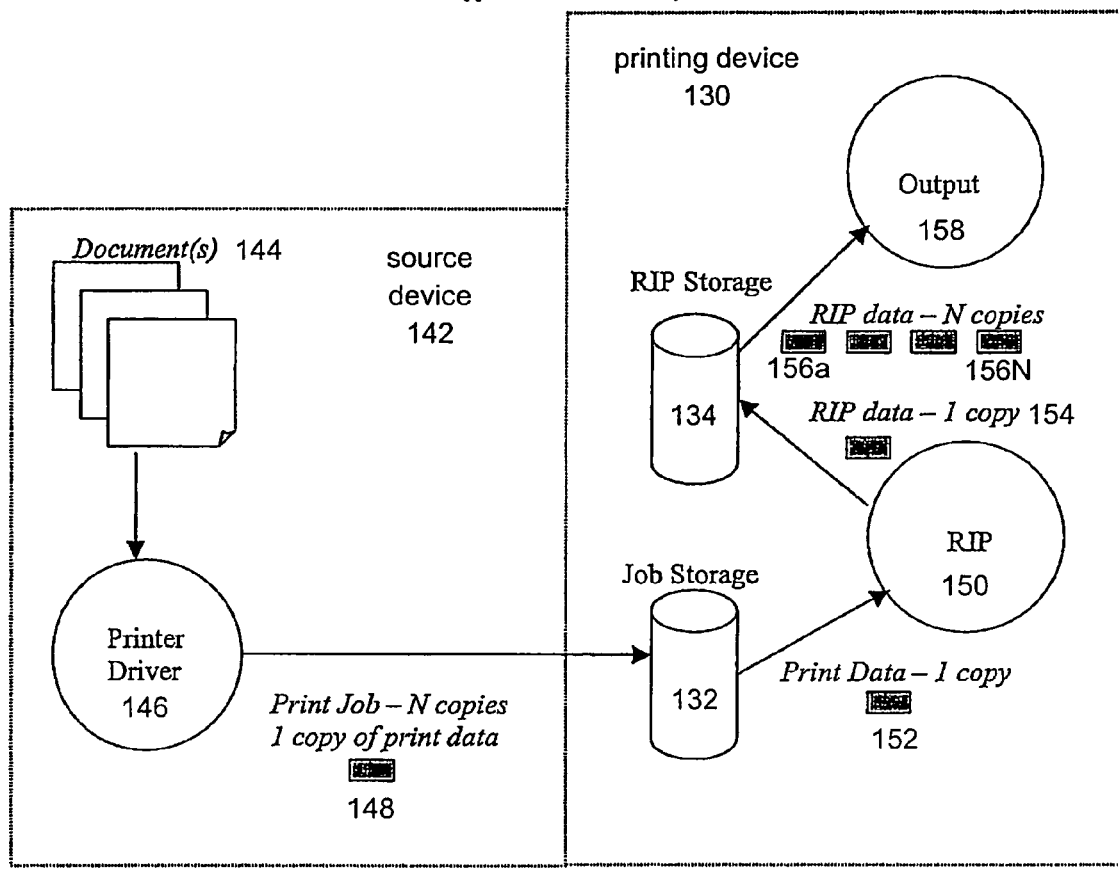
FIG. 3 is a schematic diagram of a source device and a prior art improved printing device that has ROPM capability and includes job storage and RIP storage.
Figure 4:
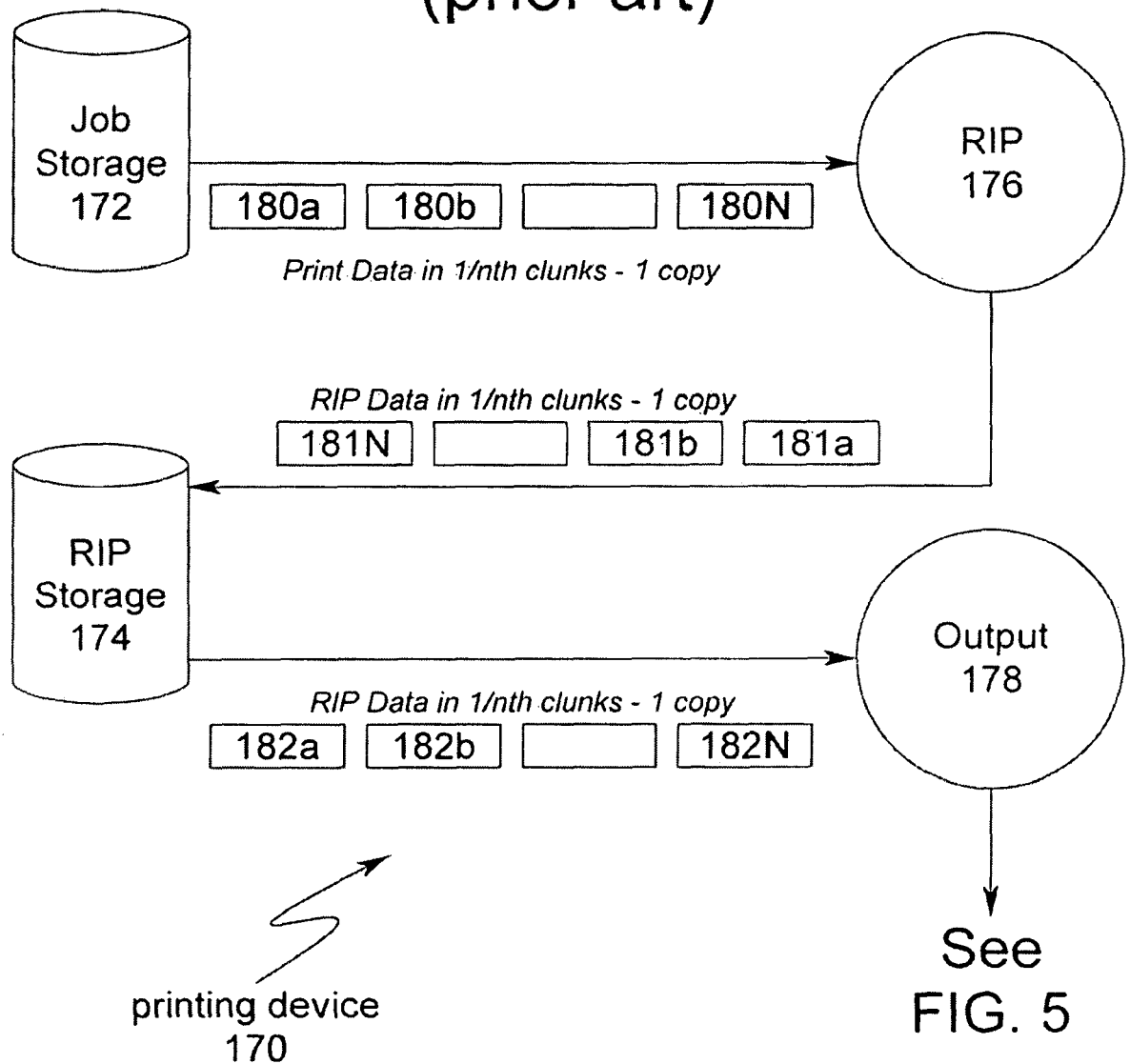
FIG. 4 is a schematic diagram of elements of a prior art printing device that has ROPM capability and includes job storage and RIP storage implementing a chunking technique.
Figure 5:
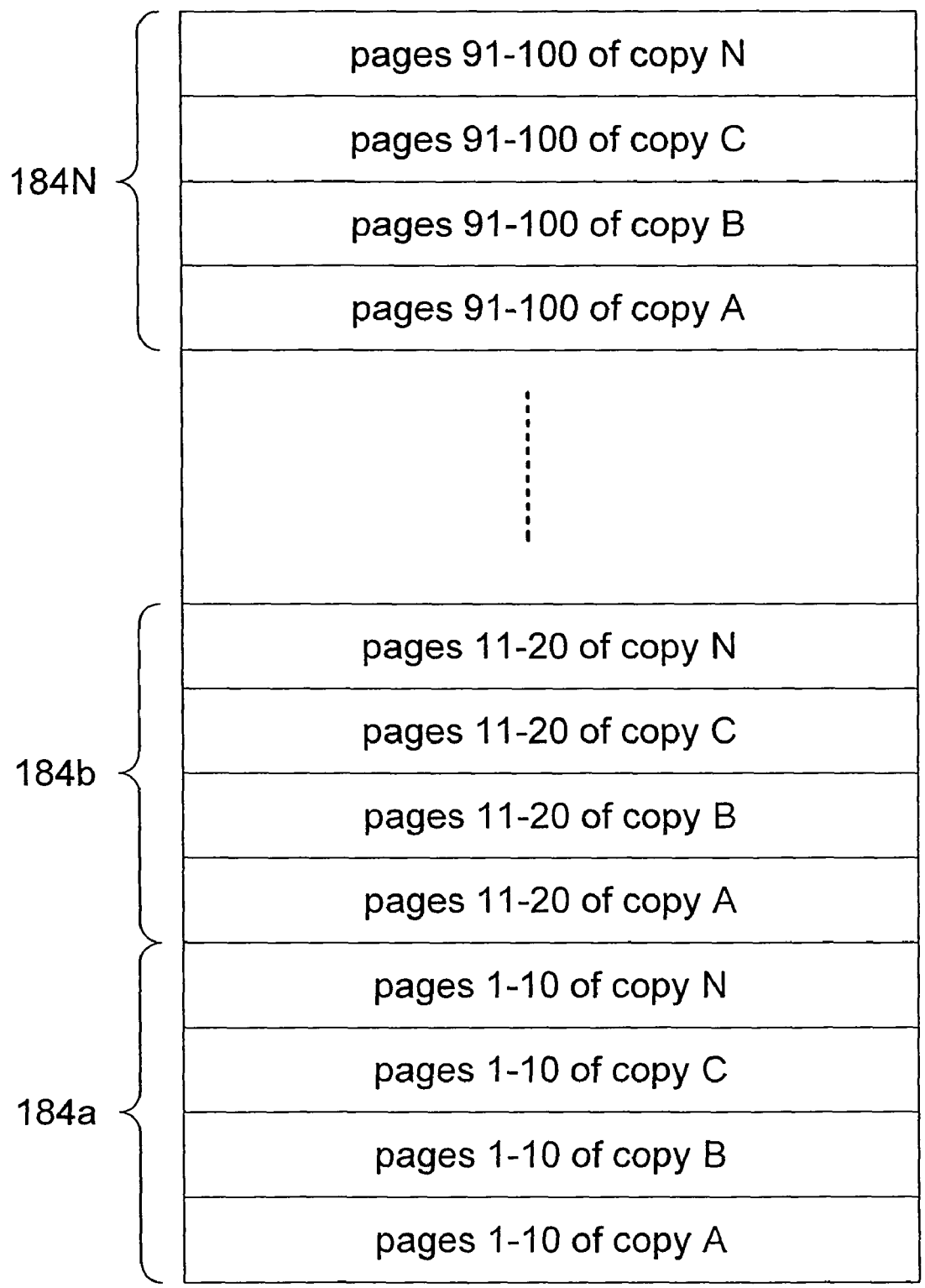
FIG. 5 shows an exemplary print output from a printing device implementing a chunking technique where the user must perform hand collation to complete the outputting process so that it is properly collated.
Figure 6:
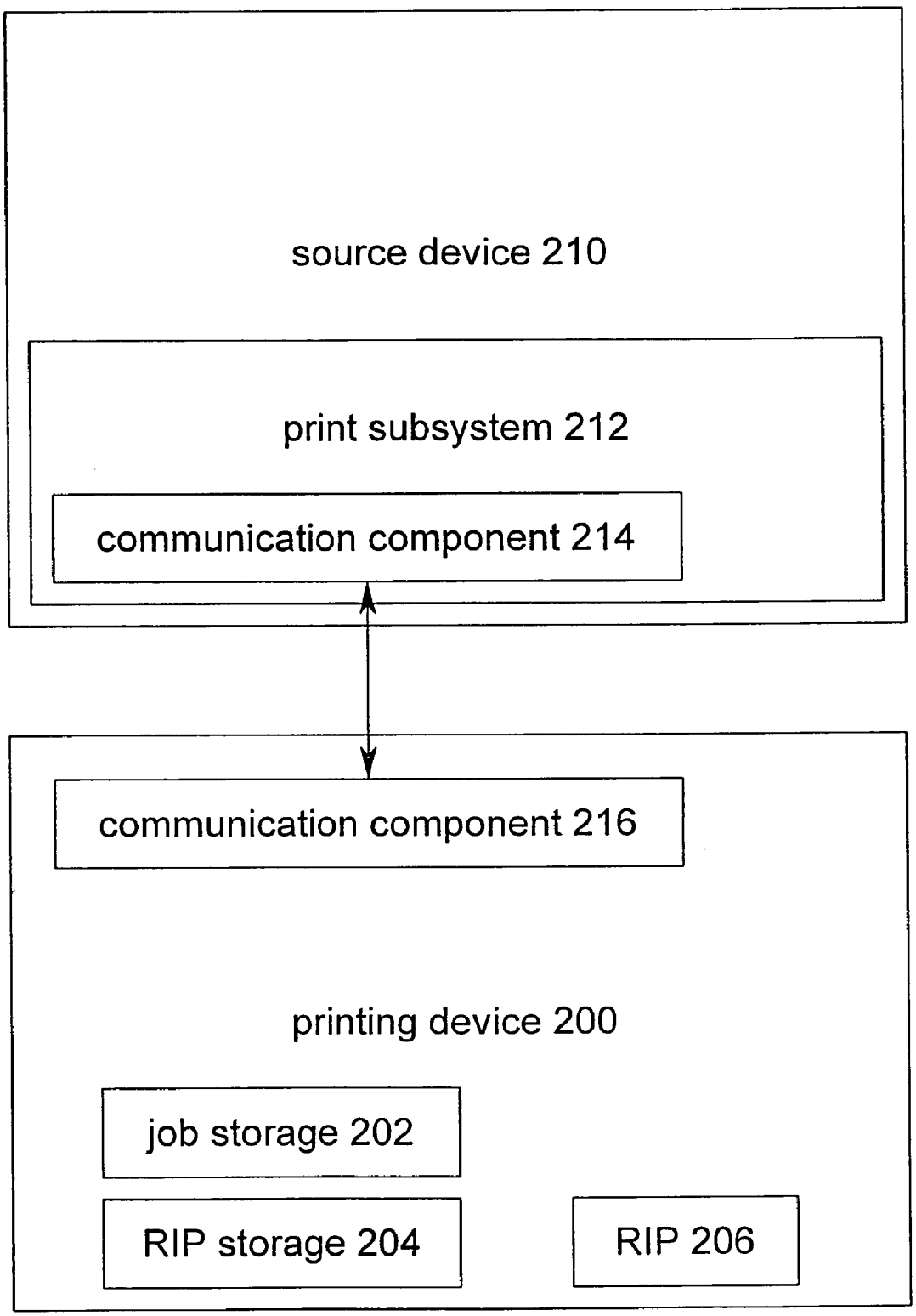
FIG. 6 is a schematic diagram of source device and an exemplary printing device of the present invention.

This invention is directed to a partial brute force collation system for handling copy collation in a printing device 200 when the combined size of the job data and RIP exceeds the storage capacity of the printing device 200. As shown in FIG. 6, the printing device 200 preferably has ROPM capabilities and at least one memory component such as job storage 202 and RIP storage 204. The printing device 200 and the source device 210 have a communication system for handling print jobs in which the entire RIP size requires storage capacity that exceeds the RIP storage capacity of the printing device 200. The point of implementation of the communication system from the source device 210 may be the communication component 214 (e.g. a de-spooler, such as a MS WINDOWS® print processor or port monitor) of the source device 210 print subsystem 212 (e.g. a printer driver, print spooler, print processor, or port manager). The printing device 200 may have a communication component 216 (e.g. a network interface, a local port manager, or a I/O channel selector) suitable for communicating with the source device 210 communication component 214 (e.g. a de-spooler).

Figure 7:
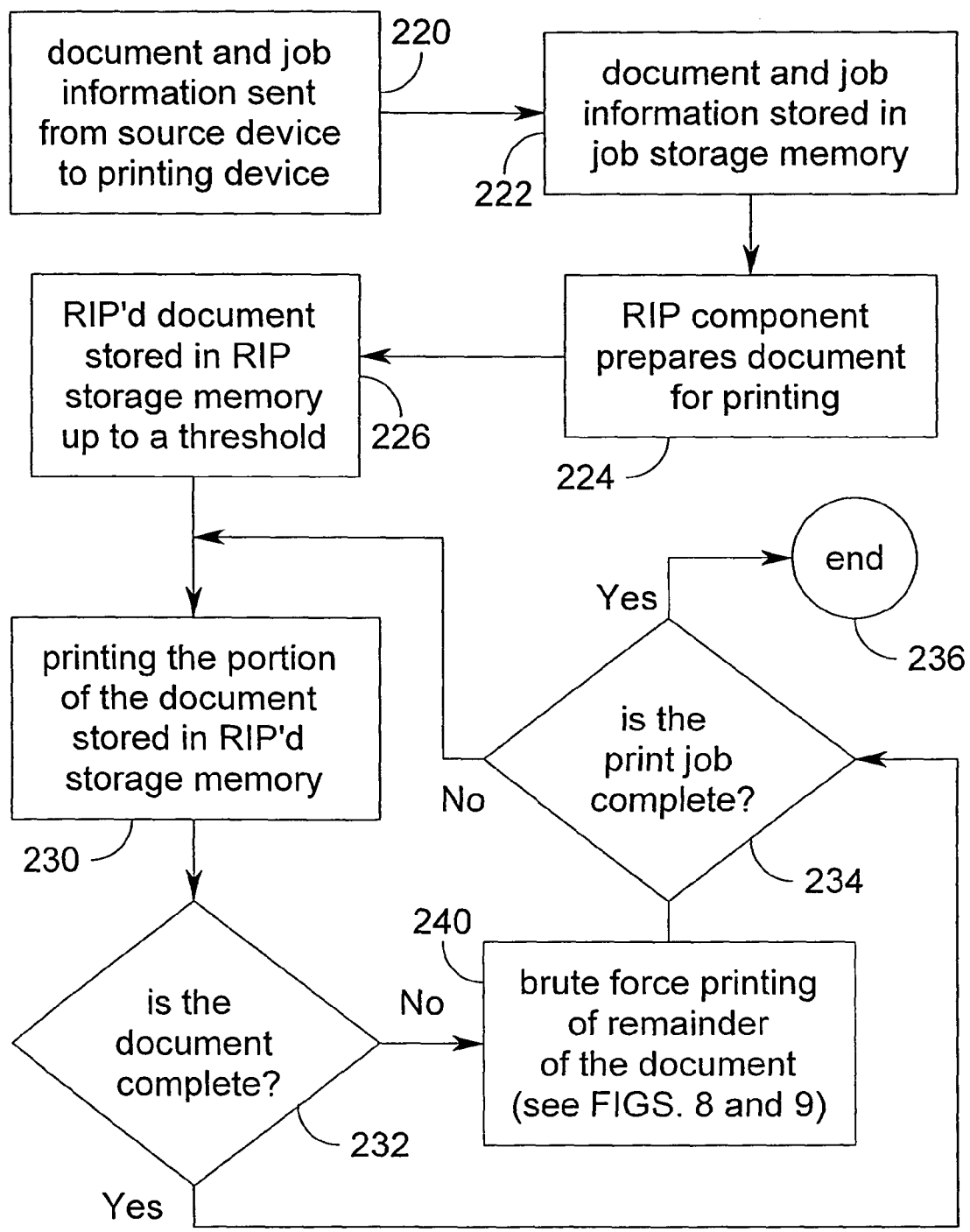
FIG. 7 is a flowchart of an exemplary method for implementing the present invention.
Figure 8:
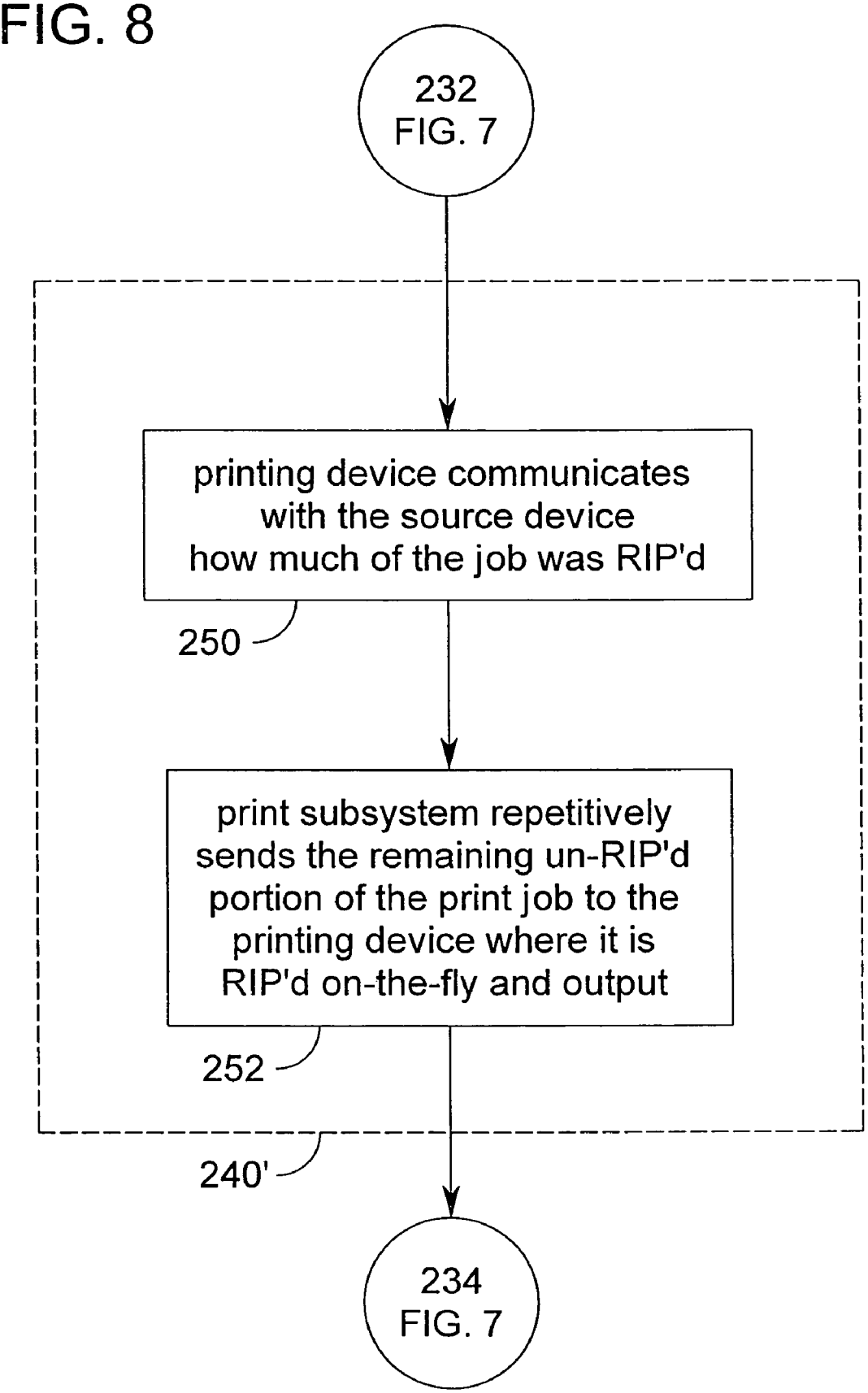
FIG. 8 is a flowchart of a first exemplary method that may be used in the brute force collation mode.
Figure 9:
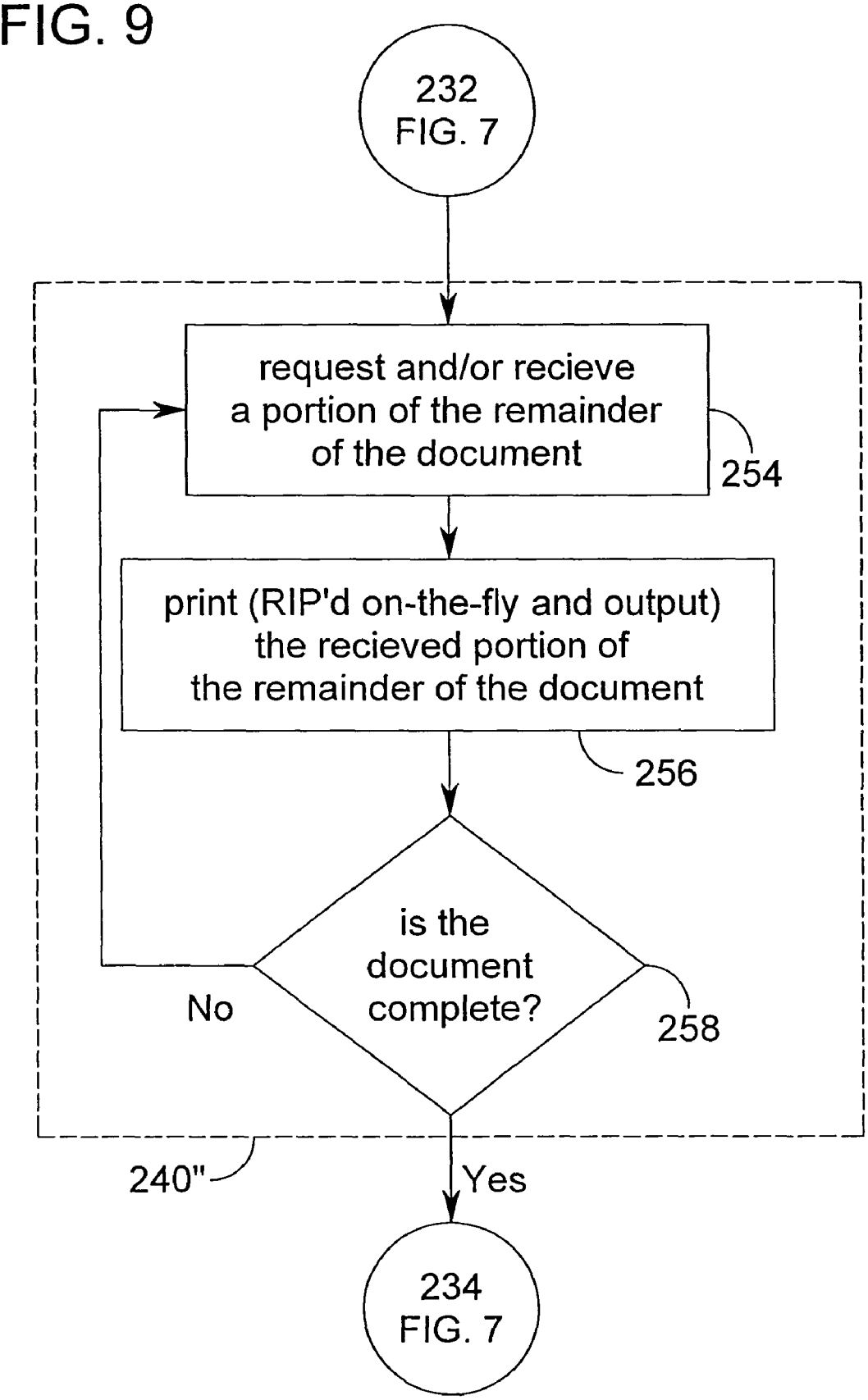
FIG. 9 is a flowchart of a second exemplary method that may be used in the brute force collation mode.

As shown in FIG. 7, using one preferred embodiment of the present invention, the source device 210 print subsystem 212 initially sends a single copy of an N copy print job for printing (step 220). In some embodiments, the document and job information are stored in job storage 202 (step 222). A RIP component 206 attempts to prepare for printing (e.g. RIP) as much of the document as it can, up to a threshold (step 224). If the threshold is not reached, the printing device 200 performs the ROPM function in the conventional manner (steps 230, 232, 234, 236). If the threshold is reached, the portion of the document that is prepared (e.g. the partial RIP job) is stored in RIP storage 204 (step 226). The document is then printed using a memory printing mode (step 230) for printing the portion of the document stored in RIP storage 204 and a brute force collation mode (step 240—examples of which are shown in FIGS. 8 and 9) for printing any portion of the document not stored in RIP storage 204. In one preferred system, the printing device 200 alternates printing the partial RIP job in RIP storage 204 (memory printing mode) in conjunction with an on-the-fly RIP (i.e., using some scratch memory set aside) of the remaining portion (brute force collation mode) to produce each collated copy. The memory printing mode and the brute force collation mode may be used for each of the N copies (step 240) such that the resulting printed output 260a, 260b, 260N is collated as shown in FIG. 10.

FIG. 8 shows a first exemplary method that may be used in the brute force collation mode 240' in which the printing device 200 communicates with the source device 210 print subsystem 212 how much of the job was RIP'd (step 250) and then, for the remaining portion of the print job, the print subsystem 212 repetitively sends the remaining un-RIP'd portion of the print job to the printing device 200, once per copy, where it is RIP'd on-the-fly and output (step 252).

FIG. 9 shows a second exemplary method that may be used in place of the method shown in FIG. 8 as the brute force collation mode 240". In this embodiment the printing device 200 requests and/or receives a portion of the remainder of the document (step 254), prints (RIPs on-the-fly and output) the received portion of the remainder of the document (step 256), and repeats steps 254 and 256 until the document is complete (step 258).

Figure 10:
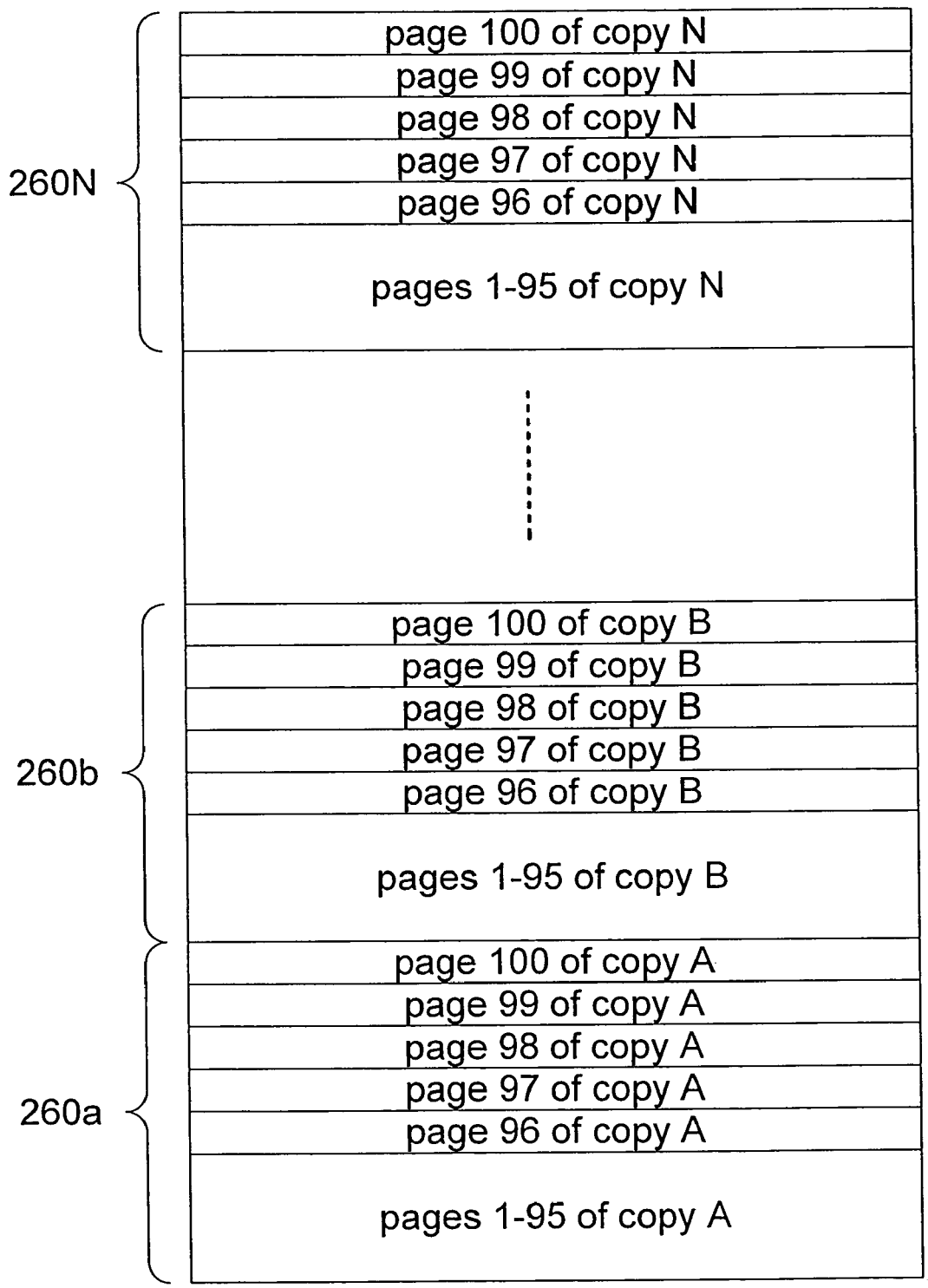
FIG. 10 shows an exemplary print output from a printing device implementing an exemplary technique of the present invention in which the document has 100 pages printed N times and is properly collated.

FIG. 10 shows an exemplary output in which a printing device 200 first prints the first 95 pages (of 100 pages) of the first copy (260a) of a document using a memory printing mode and then prints the last 5 pages of the first copy (260a) using a brute force collation mode. Specifically, in this example the printing device 200 receives the print data for the first 95 pages once, RIPs the data for the 95 pages, stores the partial RIP job in RIP storage 204, and then outputs the first 95 pages of the first copy (memory printing mode). The printing device 200 then receives, RIPs, and outputs RIP data for the remaining 5 pages (shown as one page at a time) (brute force collation mode). In the brute force collation mode each time the printing device 200 receives the remaining portion of print data, the RIP component 206 RIPs the data on-the-fly, without storage for reprint; and prints once. Thus, the printing device 200 uses sufficiently less storage (e.g. for a single page) for the on-the-fly print of the brute force collation mode. The printing device 200 next prints the first 95 pages (of 100 pages) of the second copy (260b) of a document using a memory printing mode (it is not necessary to re-RIP the data for the 95 pages because the RIP of these pages is stored as a partial RIP job in RIP storage 204) and then prints the last 5 pages using a brute force collation mode. This is repeated N times for an N copy print job. The resulting printed output 260a, 260b, 260N is collated as shown in FIG. 10. (In this embodiment, the collated print job would be printed and output face down so that the first page of the first document is on the bottom of the output stack and the last page of the last document is on the top of the output stack.)

If the example set forth in the previous embodiment were a face-up job, the sequence would be different. First, 95 pages would be RIP'd and stored. Then the remaining pages would be RIPed on-the-fly in reverse order. It should be noted that, depending on job storage, this might require more than one retransmission from the host per copy. The on-the-fly RIP pages would then be output in reverse order. Finally, the stored RIP pages would be output in reverse order.

Figure 11:
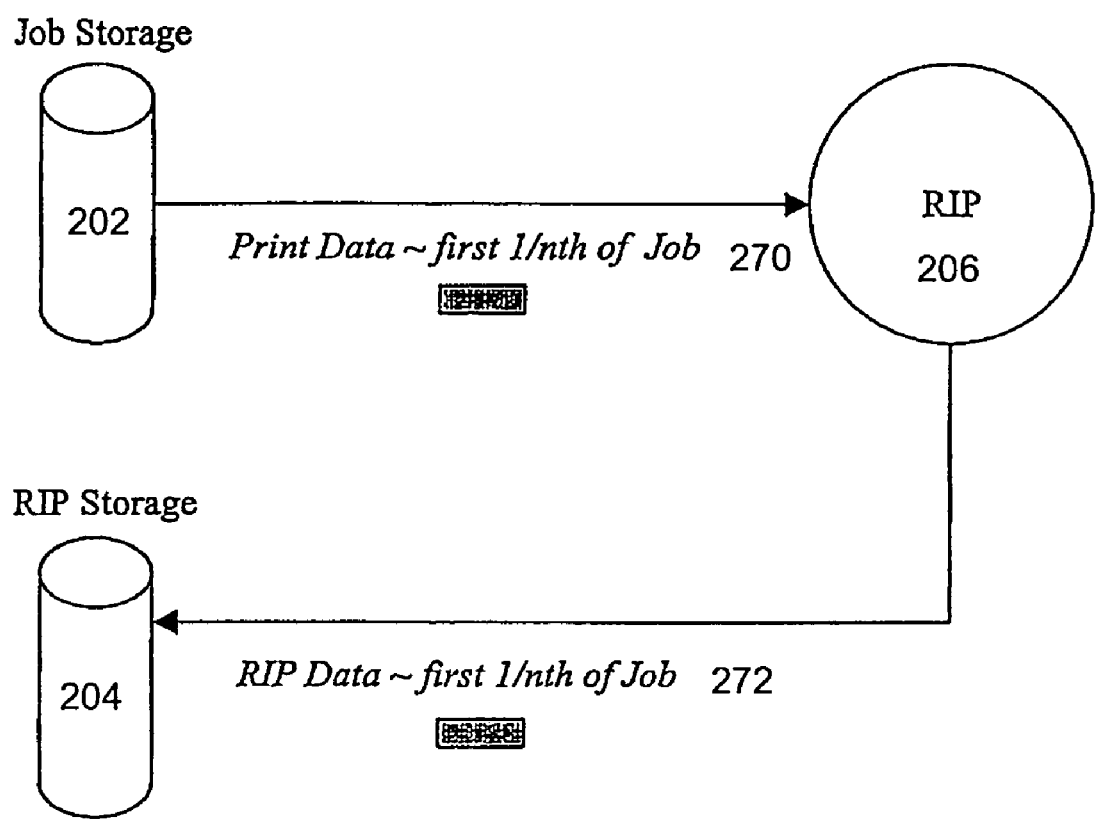
FIG. 11 is a schematic diagram of exemplary elements used in an exemplary embodiment of the front stage of the present invention.

FIG. 11 shows one exemplary preferred embodiment of the initial or front stage of the process of the present invention in which at least part of a print job is partially RIPed and partially stored. The physical components, the internal job storage 202, the RIP storage 204, and the RIP component 206 have at least three possible configurations. First, all three may be located within the printing device 200. Second, the job storage 202 and RIP component 206 might be in another device, such as the source device 210, print server, RIP server, or another imaging device. Third, there may be job storage 202 and RIP components 206 in both the second device (e.g. the source device 210) and the printing device 200.

Assuming the internal job storage 202, the RIP storage 204, and the RIP component 206 are all located within the printing device 200, in an initial stage of a process of the present invention, the printing device 200 partially RIPs and partially stores a RIP job. In this embodiment, the printing device 200 starts to process a job in a conventional manner. For example, if the printing device 200 does not have streaming capability, the printing device 200 first waits for the entire job to be spooled to internal job storage 202. If the printing device 200 does have streaming capability, the printing device 200 only waits for a subset of the job (e.g. a band, a page, a booklet) to be spooled to internal job storage 202. As the printing device 200 processes print data 270 that is internally spooled, the RIP component 206 of the printing device 200 converts the print data 270 into raster image data (RIP) or RIP data 272. Typically, the print data 270 is a page description language (PDL) such as PCL, Postscript, EscP, IPDS, PDF, or an encoded image such as TIFF, PNG, and JPEG encoded JFIF. The print data 270 is converted, if not pre-RIP'd, and stored in internal storage reserved for the RIP data (e.g. RIP storage 204) until a threshold representing the capacity of the RIP storage 204 is reached. This stored RIP data is referred to as a partial RIP job. If the print data is pre-RIP'd, an initial portion of the RIP is sent to the printer and stored. Thereafter the remaining portion of the RIP is sent to the printer per copy.

If the job storage 202 and RIP component 206 are physically located in the source device 210, the source device 210 performs the RIP process (pre-RIP) so that the print data 270 sent to the printing device 200 is pre-RIP'd.

If there is job storage 202 and RIP components 206 in both the source device 210 and the printing device 200, portions (but not all) of the print data 270 are pre-RIP'd by the source device 210, with the remaining portions RIP'd by the printing device 200 (as set forth in U.S. patent application Ser. No. 10/261,885 entitled Load-Balancing Distributed Raster Image Processing, the specification of which is incorporated herein by reference). As with the previous embodiment, the RIP'd data is stored in RIP storage 204 until a threshold representing the capacity of the RIP storage 204 is reached as a partial RIP job.

It should be noted that the printing device 200 may start the outputting process of the first copy in parallel to the process of producing the partial RIP job. Alternatively, the printing device 200 may delay the outputting process until after the process of producing the partial RIP job.

Figure 12:
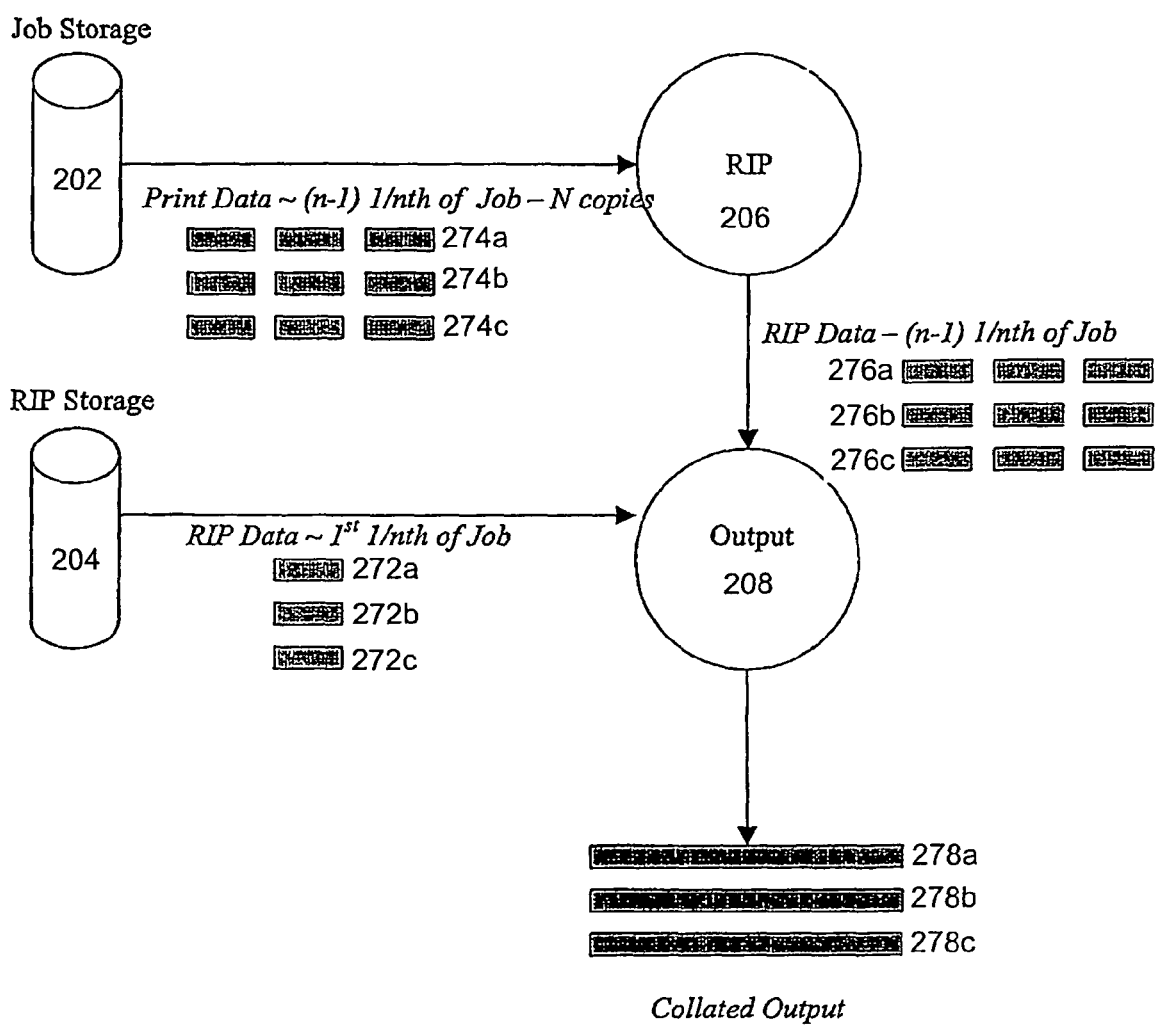
FIG. 12 is a schematic diagram of exemplary elements used in an exemplary embodiment of the back stage of the present invention.

FIG. 12 shows one exemplary preferred embodiment of the second or back stage of the process of the present invention that is implemented when the print job exceeds the storage capacity of the printing device 200. The back stage of the process includes RIPing on-the-fly (once per copy) the remaining portion of the print job and printing collated copies of the document by alternating using the memory printing mode (printing the portion of the document stored in RIP storage 204) and the brute force collation mode (printing any portion that is RIP'd on-the-fly). It should be noted that if the threshold representing the capacity of the RIP storage 204 were never reached, the process of the present invention would print a print job in a conventional manner without using the brute force collation mode of the back stage of the process. As with the initial stage, it should be noted that some of the physical components (e.g. the internal job storage 202 and/or the RIP storage 204) may be physically located in another device such as the source device 210, print server, RIP server, or another imaging device.

For purposes of this example, the partial RIP job is maintained in RIP storage 204 until the completion of outputting each copy (i.e., set). The remaining pages of the job are RIP'd on-the-fly, once per copy. This is accomplished by reserving temporary RIP storage 204' for at least one page, or band. The temporary RIP storage 204' is shown for exemplary purposes in this embodiment as being associated with the RIP component 206, but it could be associated with the job storage 202, the RIP storage 204, the outputting mechanism 208, or other components, or it could be stand-alone storage. The job storage 202, by means to be discussed below, passes the print data 274a, 274b, 274c of the remaining un-RIP'd pages to the RIP component 206. The RIP component 206 then converts the print data 274a, 274b, 274c into RIP data 276a, 276b, 276c, and temporarily holds the RIP data 276a, 276b, 276c up to the capacity of the temporary RIP storage 204'. The printing device 200 outputs each copy of the document by first retrieving the partial RIP job 272a, 272b, 272c from RIP storage 204 and passing the RIP data 272a, 272b, 272c to the outputting mechanism 208 (e.g. marking engine) for outputting. The RIP data 276a, 276b, 276c for the remaining sheets is then supplied from the temporary RIP storage 204' to the outputting mechanism 208 to be output as collated output 278a, 278b, 278c. As the temporary RIP data is consumed by the outputting mechanism 208, the temporary RIP data from each copy is purged. The RIP component 206 then takes successive chunks from the job storage 202 and continues to perform an on-the-fly RIP of the next section of un-RIP'd data Once a complete copy is output, the printing device 200 repeats the above process per copy.

An exemplary step-by-step process of the output of a three (3) copy print job (having an initial RIP data and the remaining data being divided into three portions) is as follows. It should be noted that some of these steps may be accomplished simultaneously. First Copy. First, the partial RIP job 272a of the first copy is passed from RIP storage 204 to the outputting mechanism 208 for outputting as the first part of collated output 278a. The job storage 202 passes the first portion of the print data 274a of the remaining un-RIP'd pages to the RIP component 206. The RIP component 206 then converts the first portion of the print data 274a into the first portion of the RIP data 276a, and temporarily holds it in temporary RIP storage 204' until it is passed to the outputting mechanism 208 to be output as the next portion of the collated output 278a. Once the temporary RIP data is consumed by the outputting mechanism 208, the temporary RIP data is purged. The job storage 202 then passes the second portion of the print data 274a of the remaining un-RIP'd pages to the RIP component 206. The RIP component 206 then converts the second portion of the print data 274a into the second portion of the RIP data 276a, and temporarily holds it in temporary RIP storage 204' until it is passed to the outputting mechanism 208 to be output as the next portion of the collated output 278a. Once the temporary RIP data is consumed by the outputting mechanism 208, the temporary RIP data is purged. The job storage 202 then passes the third portion of the print data 274a of the remaining un-RIP'd pages to the RIP component 206. The RIP component 206 then converts the third portion of the print data 274a into the third portion of the RIP data 276a, and temporarily holds it in temporary RIP storage 204' until it is passed to the outputting mechanism 208 to be output as the final portion of the collated output 278a. Second Copy. First, the partial RIP job 272b of the second copy is passed from RIP storage 204 to the outputting mechanism 208 for outputting as the first part of collated output 278b. The job storage 202 passes the first portion of the print data 274b of the remaining un-RIP'd pages to the RIP component 206. The RIP component 206 then converts the first portion of the print data 274b into the first portion of the RIP data 276b, and temporarily holds it in temporary RIP storage 204' until it is passed to the outputting mechanism 208 to be output as the next portion of the collated output 278b. Once the temporary RIP data is consumed by the outputting mechanism 208, the temporary RIP data is purged. The job storage 202 then passes the second portion of the print data 274b of the remaining un-RIP'd pages to the RIP component 206. The RIP component 206 then converts the second portion of the print data 274b into the second portion of the RIP data 276b, and temporarily holds it in temporary RIP storage 204' until it is passed to the outputting mechanism 208 to be output as the next portion of the collated output 278b. Once the temporary RIP data is consumed by the outputting mechanism 208, the temporary RIP data is purged. The job storage 202 then passes the third portion of the print data 274b of the remaining un-RIP'd pages to the RIP component 206. The RIP component 206 then converts the third portion of the print data 274b into the third portion of the RIP data 276b, and temporarily holds it in temporary RIP storage 204' until it is passed to the outputting mechanism 208 to be output as the final portion of the collated output 278b. Third Copy. First, the partial RIP job 272c of the third copy is passed from RIP storage 204 to the outputting mechanism 208 for outputting as the first part of collated output 278c. The job storage 202 passes the first portion of the print data 274c of the remaining un-RIP'd pages to the RIP component 206. The RIP component 206 then converts the first portion of the print data 274c into the first portion of the RIP data 276c, and temporarily holds it in temporary RIP storage 204' until it is passed to the outputting mechanism 208 to be output as the next portion of the collated output 278c. Once the temporary RIP data is consumed by the outputting mechanism 208, the temporary RIP data is purged. The job storage 202 then passes the second portion of the print data 274c of the remaining un-RIP'd pages to the RIP component 206. The RIP component 206 then converts the second portion of the print data 274c into the second portion of the RIP data 276c, and temporarily holds it in temporary RIP storage 204' until it is passed to the outputting mechanism 208 to be output as the next portion of the collated output 278c. Once the temporary RIP data is consumed by the outputting mechanism 208, the temporary RIP data is purged. The job storage 202 then passes the third portion of the print data 274c of the remaining un-RIP'd pages to the RIP component 206. The RIP component 206 then converts the third portion of the print data 274c into the third portion of the RIP data 276c, and temporarily holds it in temporary RIP storage 204' until it is passed to the outputting mechanism 208 to be output as the final portion of the collated output 278c.

In the example of the physical components (e.g. the internal job storage 202 and/or the RIP storage 204) being physically located in the source device 210, the RIP may be performed on the source device 210 (i.e., external to the printing device 200). The RIP data 276a, 276b, 276c may then be despooled from the source device 210 to the printing device 200 as temporary RIP data that is then passed to the outputting mechanism 208.

Figure 13:
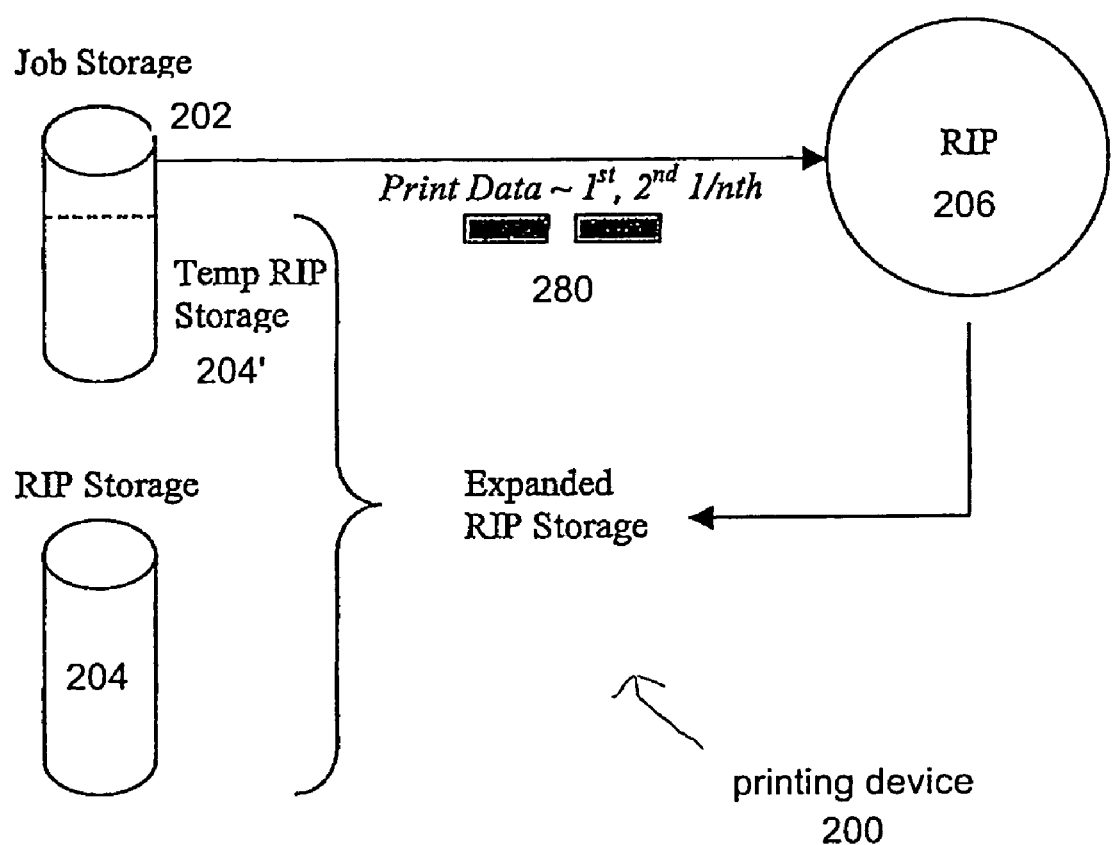
FIG. 13 is a schematic diagram of exemplary elements used in an exemplary embodiment in which the brute force partial collation is implemented within the printing device.
Figure 14:
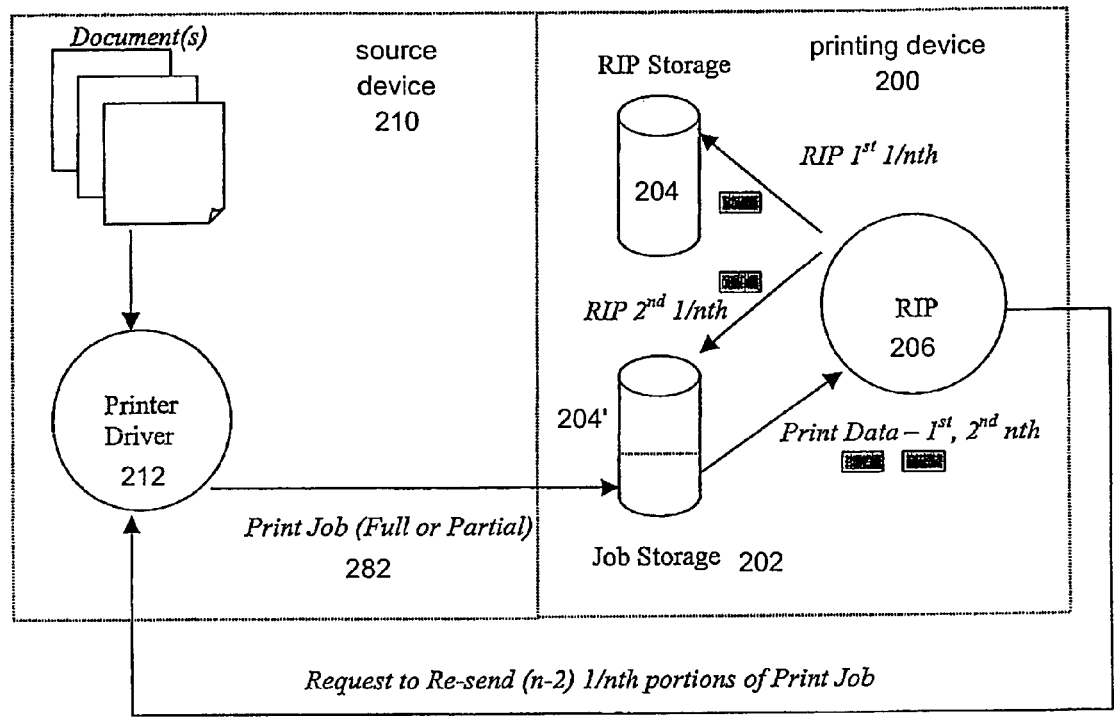
FIG. 14 is a schematic diagram of exemplary elements used in an exemplary embodiment of a first part of a process in which brute force partial collation is implemented between the printing device and the source device.
Figure 15:
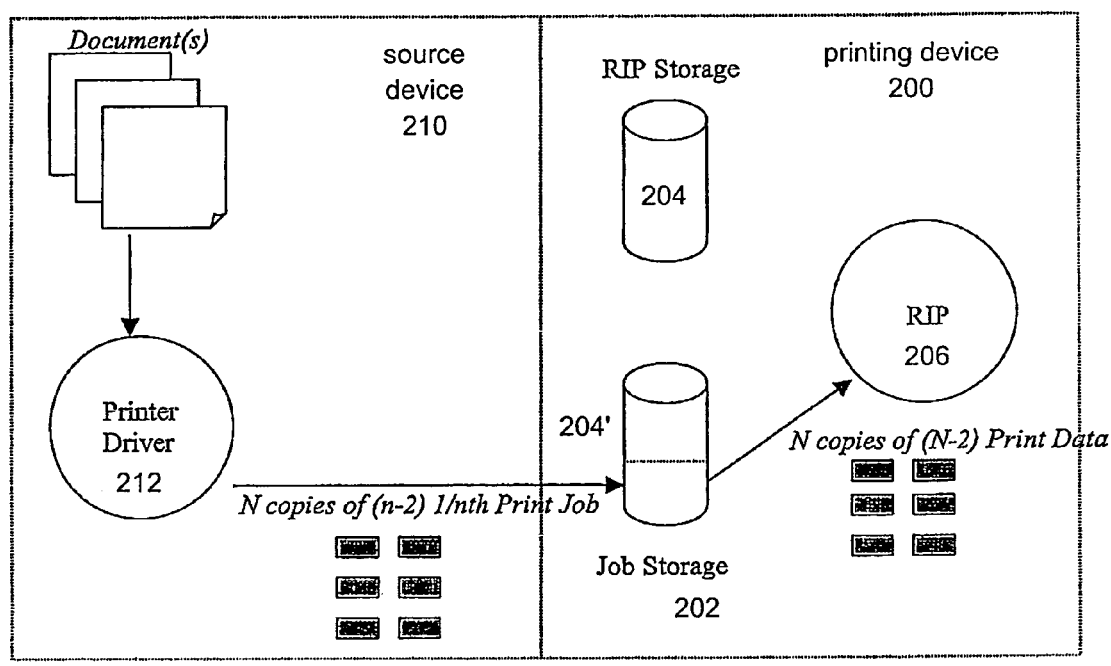
FIG. 15 is a schematic diagram of exemplary elements used in an exemplary embodiment of a second part of the processes of FIGS. 14 and 16.
Figure 16:
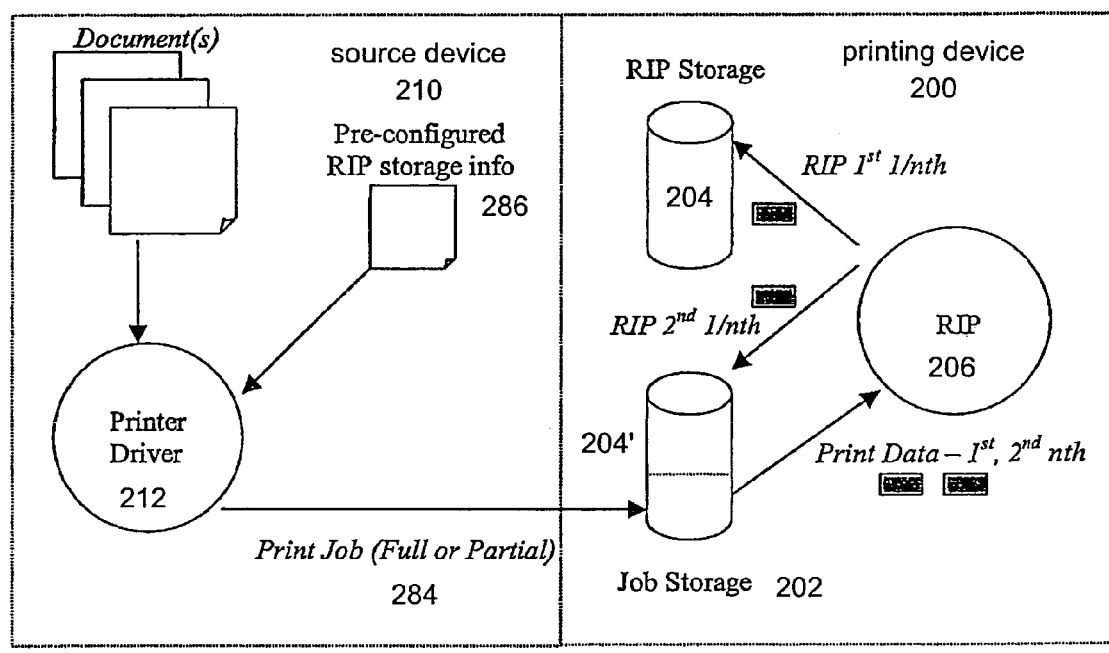
FIG. 16 is a schematic diagram of exemplary elements used in an exemplary embodiment of a first part of a process in which RIP storage and retransmission are predetermined on the source device.

FIGS. 13-16 show examples of and variations on the implementation of the basic processes shown in FIGS. 11 and 12. These figures show implementations in which unused job storage 202 is converted into temporary RIP storage 204' for the on-the-fly RIP. The size/threshold of the temporary RIP storage 204' may be predefined or dynamically determined. For example, the printing device 200 may search for unused pools of storage that have been allocated to other processes that are not currently required by the printing device 200. A specific example of this might be the unused storage in job storage 202 when there are no pending jobs for de-spooling to the printing device 200. In this case, this and other available storage becomes a candidate for temporary reallocation. FIG. 13 shows an embodiment in which the brute force partial collation is implemented within the printing device 200. FIGS. 14 and 15 show an embodiment in which brute force partial collation is implemented between the printing device 200 and the source device 210. FIG. 16 shows an embodiment in which RIP storage 204 and retransmission are predetermined on the source device 210.

FIG. 13 shows an embodiment in which the brute force partial collation is implemented within the printing device 200. In this embodiment, when the total amount of available unused storage exceeds the minimum threshold, the printing device 200 temporary reallocates the available unused job storage 202 as the RIP temporary storage 204'.

It should be noted that the print job may be streaming or non-streaming. In a non-streaming print job (i.e., printing starts after receiving the entire job), the entire print job currently resides within the job storage 202 of the printing device 200. In this case, repetitive retrieval of the remaining un-RIP'd print data 280, once per copy, is limited to retrieving the print data 280 from the job storage 202 unit. No additional communication between the source device 210 and printing device 200 is required to resubmit the print data 280. In a streaming print job (i.e., printing starts as the job is being received), a subset of the print job resides in the job storage 202. Any print data 280 for the partial RIP job that is still in job storage 202 is then purged. The printing device 200 then determines if there is sufficient available unused memory for both the remaining print data 280 and temporary RIP storage 204'. If there is sufficient unused memory available, then the process continues as above. The printing device 200 may obtain the information on whether sufficient storage will exist for the remaining print data 280 by either obtaining the total size or remaining size of the print data 280 from the source device 210, or delaying the determination until the final reception of print data 280 from the source device 210.

FIGS. 14 and 15 show an embodiment in which brute force partial collation is implemented between the printing device 200 and the source device 210. FIG. 14 shows the elements of the first part of this process and FIG. 15 shows the elements of the second part of this process.

If there is not sufficient storage to hold both the remaining job data and temporary RIP data, the printing device 200 must establish communication between itself and the source device 210. The printing device 200 may communicate with any communication component 214 of the source device 210 print subsystem 212 (e.g. printer driver, print spooler, print processor, or port manager).

In the embodiment of FIG. 14, the printing device 200 and source device 210 print subsystem 212 have established bi-directional communication for control of de-spooling print data 282 to the printing device 200. The bi-directional communication may be, for example, a single printing protocol for controlling and sending the print data 282. Alternatively, the bi-directional communication may be, for example, a second communication channel for controlling the de-spooling (e.g. proprietary protocol over TCP/IP) separate from the mechanism (e.g. LPR) that de-spools the print data 282 to the printing device 200.

Using the elements shown in FIGS. 14 and 15, the printing device 200 may output a print job as follows:

1. The outputting mechanism 208 of the printing device 200 outputs the first portion of the print job using the partial RIP job from RIP storage 204.

2. The printing device 200 communicates with the source device 210 the amount of the print job (e.g. page number) that is in RIP storage 204. This step is only required once, but may be repeated per copy.

3. The printing device 200 requests the source device 210 to de-spool, either in chunks or in its entirety, the remaining un-RIP pages.

4. The RIP component 206 then processes the remaining un-RIP pages, as received, into RIP data that may be stored in the temporary RIP storage 204'.

5. The outputting mechanism 208 outputs the next sequence of sheets using the RIP data in the temporary RIP storage 204', and then purges the RIP data in the temporary RIP storage 204'.

6. The process continues until the last sheet of the copy is output.

7. The above process is repeated per copy.

In alternative embodiments, the print data 282 may be pre-RIP'd on the source device 210. In this case, the successively re-sent RIP data for the remaining pages may be stored in the printing device 200's temporary RIP storage 204'.

If the page imposition (e.g. page output order) is different from the page input order (e.g. booklet printing), a more complicated schema is required between the printing device 200 and source device 210. In this case, the source device 210 would reorder the pages to fit a sequential page imposition, such that, the printing device 200 can output sheets from the temporary RIP storage 204' without waiting and storing data for sheets that are not currently being output.

Finally, when the last copy is output, the printing device 200 preferably releases all the reallocated storage back to their previous storage pools.

FIGS. 15 and 16 show an embodiment in which RIP storage 204 and retransmission are predetermined on the source device 210. In this embodiment, a communication component 214 of the source device 210 print subsystem 212 (e.g. printer driver, print spooler, print processor, or port manager) performs the functions described above for repetitively retransmitting the remaining un-RIP'd pages, but without the use of bi-directional communication between the printing device 200 and source device 210 for controlling the retransmission. FIG. 16 shows the elements of the first part of this process and FIG. 15 shows the elements of the second part of this process.

In this embodiment, the size, capacity, and/or threshold of RIP storage 204 and temporary RIP storage 204' are predetermined and known by the source device 210 print subsystem 212. For example, the size of RIP storage 204 and temporary RIP storage 204' may be configurable attributes in the printer driver.

Using the elements shown in FIGS. 15 and 16, the printing device 200 may output a print job as follows:

1. The source device 210 printer driver 212 (or a preconfiguration component 286 thereof) determines how much of the print data 284 will fit into the RIP storage 204 once the print data 284 is RIP'd. If the source device 210 performs the RIP, a one-to-one calculation can be made. If the RIP is performed on the source device 210, a complexity measurement can be used by the source device 210 to estimate the size of the RIP data. It should be noted that the size of the RIP data of two different images of the same size and resolution can be different if they are compressed on the printing device when stored.

2. The source device 210 de-spools the initial portion of the print data 284 that will fit into the RIP storage 204.

3. The printing device 200 performs the RIP, if any, and stores the partial RIP job in RIP storage 204.

4. The printing device 200 reallocates available unused storage for the temporary RIP storage 204'.

5. The printing device 200 starts outputting, serially or in parallel, the first portion of a copy of the print job.

6. The source device 210 sends the remaining un-RIP'd job data (in its entirety or in portions) to the printing device 200.

7. The printing device 200 meters the acceptance of the remaining print data 284 at a rate that allows it to RIP data into the temporary RIP storage 204', output the corresponding sheets, purge the temporary RIP data, and accept the next portion of print data 284.

8. Steps 5-7 of this process are repeated for each copy.

ALTERNATIVE EMBODIMENTS

It should be noted that in some of the embodiments described above, some of job storage 202 may be purged and reallocated (made into) temporary RIP storage 204'. The remaining print data 270 may then be successively re-sent to printing device 200. For example, for non-streaming print jobs, a portion of the already allocated job storage 202 for this print job is purged and reallocated for the temporary RIP storage 204'. In this exemplary embodiment, there is sufficient storage for holding the entire job data in job storage 202 and printing does not begin until after the entire job has been de-spooled to the printing device 200. As before, the process starts by generating the partial RIP job until the RIP storage 204 threshold. Once this threshold is reached, the printing device 200 purges some or all of the print job, and reallocates the storage to the RIP and/or temporary RIP storage 204'. The temporary RIP storage 204' may also be expanded from additional other available unused storage. In the initial process of reallocation, preferably only the job data associated with the partial RIP job is reallocated to the temporary RIP storage 204'. The processing of the job then continues as normal until either the job is fully output or a threshold is reached. If the threshold is reached again, however, some portion of the remaining job data may be purged from the job storage 202 and the associated storage may then be reallocated to the temporary. RIP storage 204'. Also, the newly RIP'd data in RIP storage 204 from the first to the second threshold may become part of the expanded partial RIP job and may then be reused by the outputting mechanism 208 for each subsequent copy. Processing of the remaining un-RIP'd data may proceed by any of the methods discussed above.

It should be noted that the means for alternating between the memory printing mode and the brute force collation mode may be one or more computer programs (e.g. software or firmware). Alternatively, the alternating may be accomplished by mechanical means. The alternating means may be controlled by the source device (or a subsystem thereof, by the printing device (or a subsystem thereof), by an intermediate device, or by a user through user interface.

It should be noted that although the present invention has been discussed primarily in terms of printing, alternative embodiments of the present invention include other imaging operations such as fax, scan, copy, and document management (e.g. document archive retrieval, manipulation, and transfer). The term "printing device" is meant to include devices to implement these alternative embodiments.

It should be noted that the embodiments of the spooling and de-spooling subsystems described above are meant to be exemplary and are not meant to limit the scope of the invention. For example, the present invention may use the spooling and de-spooling subsystems of the Apple Macintosh Operating System, Linux Operating System, System V UNIX Operating Systems, BSD UNIX Operating Systems, OSF UNIX Operating Systems, IBM Mainframe MVS Operating System, and/or IBM AS/400.

It should be noted that an alternative embodiment of the present invention would be to replace the source device 210 print subsystem 212 with another printing device print subsystem, such as in tandem printing. In yet another alternative embodiment, the source device 210 print subsystem 212 may be de-spooling all (e.g. copy splitting) or parts of a job (e.g. document splitting) to multiple printing devices 200 (i.e., cluster printing).

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A system for partial brute force collation of a print job received from a, source device, said print job including N copies of an electronic document, said document having a document storage requirement to be stored in memory, said system comprising:

(a) a printing device having ROPM capability and at least one memory having a memory storage capacity;

(b) said printing device having document reception capability for receiving a portion of said document from said source device;

(c) said at least one memory storing said portion of said document received from said source device;

(d) said printing device having a memory printing mode for printing said portion of said document stored in said at least one memory;

(e) said printing device having a brute force collation mode for printing any portion of said document not stored in said at least one memory; and (f) means for alternating said memory printing mode and said brute force collation mode for each of the N copies of the electronic document of the print job such that the resulting printed output is collated;

(g) wherein said portion of said document stored in said at least one memory during said memory printing mode is used so that said portion of said document stored in said at least one memory is not resent to said printing device throughout said print job.

2. The system of claim 1 wherein said document storage requirement exceeds said memory storage capacity.

3. The system of claim 1 wherein said at least one memory includes prepared document storage memory and a prepared version of said document exceeds storage capacity of said prepared document storage memory.

4. The system of claim 3, said printing device having a document preparation component for preparing said prepared version of said document from said portion of said document from said source device.

5. The system of claim 3, said portion of said document from said source device is a prepared version of said document.

6. The system of claim 1 wherein said at least one memory includes job storage memory and prepared document storage memory.

7. The system of claim 1 wherein said source device is associated with a communication component for transmitting said document to said printing device.

8. The system of claim 1 wherein said source device is associated with a de-spooler for transmitting said document to said printing device.

9. The system of claim 1, said portion of said document being a first portion of said document that is less than the entire document, and said any portion of said document not stored in said at least one memory being a second portion of said document.

10. A method for partial brute force collation of a print job received from a source device by a printing device having ROPM capability and at least one memory having a memory storage capacity, said print job including N copies of an electronic document, said document having a document storage requirement to be stored in memory, said method comprising the steps of
   (a) receiving a portion of said document from said source device on said printing device;
   (b) storing said portion of said document received from said source device in said at least one memory;
   (c) printing said portion of said document stored in said at least one memory using a memory printing mode;
   (d) printing any portion of said document not stored in said at least one memory using a brute force collation mode; and
   (e) repeating steps (c) and (d) for each of the N copies of the electronic document of the print job such that the resulting printed output is collated;
   (g) using said portion of said document stored in said at least one memory during said memory printing mode so that said portion of said document stored in said at least one memory is not resent to said printing device throughout said print job.

11. The method of claim 10, said step of receiving a portion of said document from said source device on said printing device further comprising the step of receiving said document up to a threshold.

12. The method of claim 10, said step of printing said portion of said document stored in said at least one memory using a memory printing mode further comprising the step of printing a RIPed portion of said document stored in RIP storage memory.

13. The method of claim 10, said step of printing any portion of said document not stored in said at least one memory using a brute force collation mode further comprising the steps of:
   (a) receiving a portion of said document not stored in said at least one memory;
   (b) preparing said portion of said document not stored in said at least one memory for output; and
   (c) outputting said, portion of said document not stored in said at least one memory.

14. The method of claim 13 further comprising the step of storing said prepared portion of said document in temporary prepared document storage memory having a predefined temporary memory storage capacity.

15. The method of claim 13 further comprising the step of storing said prepared portion, of said document in temporary prepared document storage memory having a dynamically determined temporary memory storage capacity.

16. The method of claim 10, said step of printing any portion of said document not stored in said at least one memory using a brute force collation mode further comprising the steps of:
   (a) receiving a pre-prepared portion of said document not stored in said at least one memory; and
   (b) outputting said portion of said document not stored in said at least one memory.

17. The method of claim 10 further comprising the step of said printing device requesting an additional portion of said document from said source device.

18. The method of claim 10 further comprising the step of said source device transmitting a portion of said document having a predetermined size to said printing device.

19. The method of claim 10,
   (a) said step of receiving a portion of said document from said source device on said printing device further comprising the step of receiving a first portion of said document from said source device on said printing device, said first portion of said document being less than the entire document;
   (b) said step of storing said portion of said document received from said source device in said at least one memory further comprising the step of storing said first portion in said at least one memory;
   (c) said step of printing said portion of said document stored in said at least one memory using a memory printing mode further comprising the step of printing said first portion using a memory printing;
   (d) said step of printing any portion of said document not stored in said at least one memory using a brute force collation mode further comprising the step of printing a second portion of said document not stored in said at least one memory using a brute force collation mode.

20. A printing device capable of partial brute force collation of a print job received from an external source device, said print job including N copies of an electronic document, said document having a document storage requirement to be stored in memory, said printing device comprising:
   (a) said printing device having ROPM capability and at least one memory having a memory storage capacity;
   (b) said printing device having means for receiving a portion of said document from said source device;
   (c) said at least one memory storing said portion of said document received from said source device;
   (d) said printing device having a memory printing mode for printing said portion of said document stored in said at least one memory;
   (e) said printing device having a brute force collation mode for printing any portion of said document not stored in said at least one memory; and
   (f) means for alternating said memory printing mode and said brute force collation mode for each of the N copies of the electronic document of the print job such that the resulting printed output is collated;
   (g) wherein said portion of said document stored in said at least one memory is used during said memory printing mode so that said portion of said document stored in said at least one memory is not resent to said printing device throughout said print job.

* * * * *

UNITED STATES PATENT AND TRADEMARK OFFICE
CERTIFICATE OF CORRECTION

| | | |
|---|---|---|
| PATENT NO. | : 7,847,967 B2 | Page 1 of 1 |
| APPLICATION NO. | : 10/977906 | |
| DATED | : December 7, 2010 | |
| INVENTOR(S) | : Andrew Rodney Ferlitsch | |

It is certified that error appears in the above-identified patent and that said Letters Patent is hereby corrected as shown below:

Column 1
Line 15, change "thereof to" to --thereof) to--

Column 2
Line 53, change "182b" to --182a--

Column 5
Line 34, change "reprint; and" to --reprint, and--

Column 7
Line 35, change "First Copy." to --*First Copy.*--
Line 62, change "Second Copy." Should be --*Second Copy.*--

Column 8
Line 23, change "Third Copy." to --*Third Copy.*--

Column 11
Line 41, change "temporary. RIP" to -- temporary RIP--
Line 52, change "thereof, by" to --thereof), by--

Column 12
Line 20, change "from a, source" to --from a source--

Column 13
Line 12, change "the steps of" to --the steps of:--
Line 47, change "said, portion" to --said portion--

Signed and Sealed this
Ninth Day of August, 2011

David J. Kappos
*Director of the United States Patent and Trademark Office*